(12) United States Patent
Krimmer et al.

(10) Patent No.: US 7,422,194 B2
(45) Date of Patent: Sep. 9, 2008

(54) SOLENOID VALVE, E.G. A TANK-VENT VALVE FOR TANK VENTILATION IN MOTOR VEHICLES

(75) Inventors: Erwin Krimmer, Pluederhausen (DE); Wolfgang Schulz, Bietigheim-Bissingen (DE); Achim Meisiek, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 10/468,538

(22) PCT Filed: Jun. 28, 2002

(86) PCT No.: PCT/DE02/02364

§ 371 (c)(1),
(2), (4) Date: Jan. 21, 2004

(87) PCT Pub. No.: WO03/052307

PCT Pub. Date: Jun. 26, 2003

(65) Prior Publication Data

US 2004/0113113 A1 Jun. 17, 2004

(30) Foreign Application Priority Data

Dec. 18, 2001 (DE) ................................ 101 61 995

(51) Int. Cl.
*F16K 31/02* (2006.01)
(52) U.S. Cl. ............................. 251/129.17; 251/335.2; 251/337
(58) Field of Classification Search ............ 251/129.17, 251/129.22, 129.21, 331, 335.2, 337
See application file for complete search history.

(56) References Cited

U.S. PATENT DOCUMENTS

| 2,211,167 | A | * | 8/1940 | Safford ........................ 251/331 |
| 3,245,651 | A | * | 4/1966 | Erickson ................. 251/129.17 |
| 5,116,020 | A | * | 5/1992 | Peng et al. ............. 251/129.17 |
| 5,265,843 | A | * | 11/1993 | Kleinhappl ............. 251/129.17 |
| 5,386,849 | A | * | 2/1995 | Gilchrist et al. ......... 251/129.17 |
| 5,630,403 | A | * | 5/1997 | Van Kampen et al. .. 251/129.17 |
| 5,758,864 | A | * | 6/1998 | Asai ....................... 251/129.17 |

(Continued)

FOREIGN PATENT DOCUMENTS

DE 40 23 044 1/1992

(Continued)

OTHER PUBLICATIONS

English Language Abstract of JP 2000 320714.

(Continued)

*Primary Examiner*—John Bastianelli
(74) *Attorney, Agent, or Firm*—Kenyon & Kenyon LLP

(57) ABSTRACT

A solenoid valve, such as, for example, a tank-vent valve for tank venting in motor vehicles, includes at least one valve orifice forming a sealing seat, and a valve member, which cooperates with the sealing seat for releasing and closing it, the valve member being stressed by at least one spring element and activated by an electromagnet. An essentially unstressed neutral position of at least one additional spring element, which acts upon the valve member in the activation direction, is provided in which the valve member is set apart from the sealing seat. In this manner, the impact of the valve member on the sealing seat, which may be accompanied by distracting noises and wear, is damped.

13 Claims, 2 Drawing Sheets

U.S. PATENT DOCUMENTS

| | | | |
|---|---|---|---|
| 5,863,025 A * | 1/1999 | Noya | 251/129.17 |
| 6,006,728 A * | 12/1999 | Matsuda et al. | 251/129.17 |
| 6,082,705 A * | 7/2000 | Arvidsson | 251/129.17 |
| 6,321,725 B1 * | 11/2001 | Krimmer et al. | 251/129.16 |
| 6,415,817 B1 | 7/2002 | Krimmer et al. | |
| 6,651,951 B2 * | 11/2003 | Krimmer et al. | 251/129.15 |
| 6,719,268 B2 * | 4/2004 | Fukano et al. | 251/129.17 |

FOREIGN PATENT DOCUMENTS

| | | |
|---|---|---|
| DE | 195 16 545 | 11/1996 |
| DE | 199 47 848 | 5/2000 |
| DE | 199 01 090 | 7/2000 |
| DE | 19901090 A1 * | 7/2000 |
| GB | 1122316 | 8/1968 |
| JP | 2000 320714 | 11/2000 |
| WO | WO 01 90611 | 11/2001 |
| WO | WO 02/075143 A1 * | 9/2002 |

OTHER PUBLICATIONS

English Language Abstract of DE 199 47 848.
English Language Abstract of DE 199 01 090.

\* cited by examiner

SOLENOID VALVE, E.G. A TANK-VENT VALVE FOR TANK VENTILATION IN MOTOR VEHICLES

BACKGROUND INFORMATION

The present invention is based on a solenoid valve, in particular a tank-vent valve for tank ventilation in motor vehicles according to the definition of the species in Claim 1, having at least one valve orifice, which forms a sealing seat, and a valve member, which cooperates with it to release and close the sealing seat, the valve member being stressed by at least one spring element and actuated by an electromagnet.

Such a solenoid valve is known from DE 199 01 090 A1, where it is used as a tank-vent valve for the metered admixing into an intake manifold, or directly into a cylinder of the internal combustion engine, of fuel volatized from the fuel tank of an internal combustion engine.

SUMMARY OF THE INVENTION

Since the valve member is set apart from the sealing seat in the neutral position of the additional spring element, this spring element exerts forces, such as traction forces or compressive forces, on the valve member when the valve member, starting from the neutral position, moves toward the sealing seat. These forces attempt to reset the valve member into the neutral position and thus are directed counter to the closing forces acting upon the valve member. As a result, the impact of the valve member on the sealing seat, which is accompanied by disruptive noise and wear, is damped. Therefore, the measures according to the present invention lead to a considerable reduction in the operating noise of the solenoid valve, which is advantageous in particular in the case of motor vehicles, given today's demands on comfort.

According to a preferred specific embodiment of the present invention, the solenoid valve is a valve that is closed in a currentless manner and opened by being supplied with current, the one spring element pressing the valve member into a position that closes the sealing seat. Upon deflection of the additional spring element from the neutral position, its forces acting upon the valve member are then directed counter to the closing forces of the one spring element, but are less than these, so as to ensure a sealing closing of the solenoid valve.

In a preferred manner, the additional spring element is formed by a hollow, dynamically balanced molded rubber part, which is elastic at least in the axial direction and stressed in this direction, and which radially encloses the one spring element. Rubber, as is well known, combines spring properties with high material damping, which is advantageous for the present intended purpose. Furthermore, molded parts having the desired spring characteristics may be produced inexpensively from rubber. Since the molded rubber part surrounds the one spring element formed by a helical spring, for instance, a compact design of the solenoid valve results as well.

According to a further development, the molded rubber part acting as spring element may include a section that curves radially outward. The elastic deformation will then take place mainly in the expanded section on which a bending load is placed during axial movements. Similarly to expansion bellows, such a radial expansion offers a relatively large material reserve in the axial direction, which is why a molded rubber part having such a design may be used in an advantageous manner even in the case of solenoid valves having larger valve lifts.

According to an additional specific embodiment, the molded rubber part is in the shape of a hollow cylinder and has a wall thickness that is reduced compared to other regions in a section located between the armature and the magnetic core. This region having thinner walls then primarily forms the elastic deformation area of the rubber spring.

BRIEF DESCRIPTION OF THE DRAWING

Exemplary embodiments of the present invention are shown in the drawing and explained in greater detail in the following description.

The Figures show.

DESCRIPTION OF THE EXEMPLARY EMBODIMENTS

Figure 1:
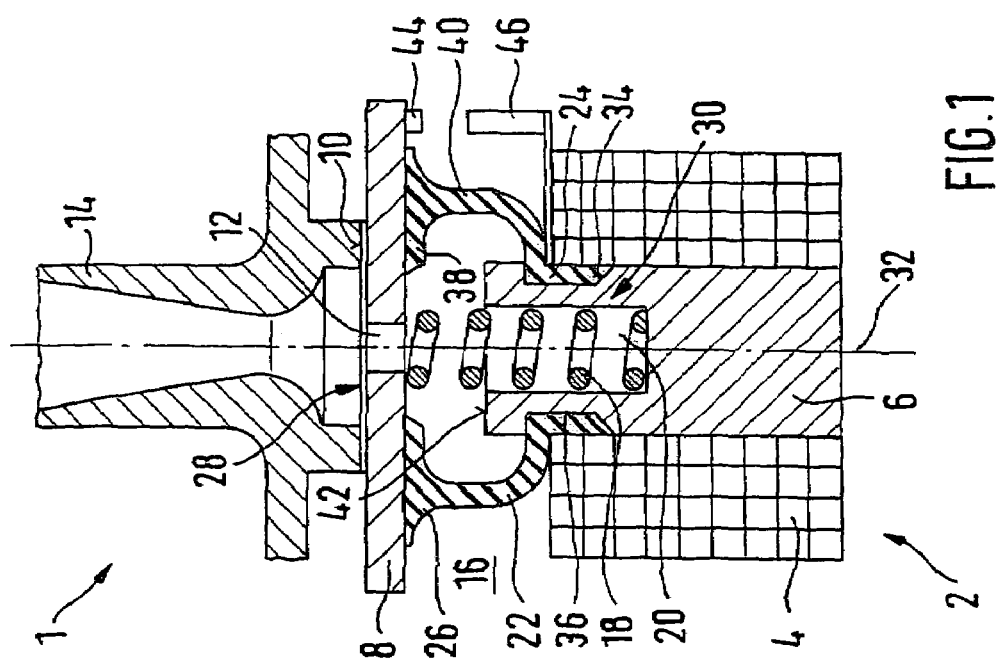
FIG. 1 in a highly schematized representation, a longitudinal section through a tank-vent valve according to a preferred specific embodiment of the present invention, shown including a valve member stressed by a helical spring.

A tank-vent valve shown in FIG. 1 in longitudinal section as an exemplary embodiment for an arbitrary solenoid valve is used for the metered admixing of fuel, evaporated from a fuel tank of a mixture-compressing internal combustion engine having external ignition, into the internal combustion engine, for instance into an intake manifold or, in a direct injection of fuel, directly into a cylinder of the internal combustion engine, and is part of a fuel-evaporation retaining system (not shown further) of the internal combustion engine. A tank-vent valve and its function may be gathered, for instance, from DE 40 23 044 A1 and from DE 195 16 545 A1, to which reference is made here.

For reasons of scale, only an electromagnet 2 with a magnetic core 6 enclosed by an excitation coil 4, an armature 8 forming the valve member and a sealing seat 10 are shown of tank-vent valve 1. The armature is preferably embodied as armature plate 8 having a centrical feed-through opening 12. Armature plate 8 lies across from a valve orifice having sealing seat 10, the valve orifice being formed in a discharge-connector 14. Discharge connector 14 is in connection with an intake manifold of an internal combustion engine, feed-through opening 12 being used for pressure compensation between the intake manifold and the atmosphere. Chamber 16 between electromagnet 2 and a valve housing (not shown) is in connection with a venting nipple of a fuel tank or with a reservoir for the volatized fuel, which is downstream from the fuel tank and filled with activated carbon.

Preferably, tank-vent valve 1 is a solenoid valve, which is closed in a currentless manner, i.e., in the currentless state of excitation coil 4 no magnetic forces act upon armature plate 8, which, due to the effect of a spring element 18, is pressed against sealing seat 10 and sealingly closes it, so that no volatized fuel is able to reach discharge connector 14. The spring element is preferably formed by a helical spring 18, which is supported in a blind hole 20 of magnetic core 6 by its one end and on armature plate 8 by its other end. Moreover, an additional spring element 22 is provided, which acts upon armature plate 8 in the activation direction and is formed, for instance, by an elastic molded rubber part, which is secured in position on magnetic core 6 by its one end 24 and on armature plate 8 by its other end 26. Molded rubber part 22 is hollow and dynamically balanced, for example, and has orifices 28, 30 at the extremity, and radially encloses helical spring 18, thereby being switched in parallel thereto in functional respects. Molded rubber part 22 is simultaneously used as membrane for the pressure compensation and seals chamber 16 from feed-through opening 12 and discharge connector 14. Excitation coil 4, magnetic core 6, helical spring 18, molded rubber part 22, armature plate 8 and sealing seat 10 are arranged coaxially with a longitudinal valve axis 32.

By its one extreme orifice 30, molded rubber part 22 is radially mounted on magnetic core 6 and secured in position on its outer peripheral area. This may be realized, for instance, in that the one extreme orifice 30 of molded rubber part 22 is provided with an annular projection 34, which projects radially inward and engages in a form-fitting manner with a complementary annular groove 36 at the outer circumference of magnetic core 6. Alternatively, or additionally, this end of molded rubber part 22 could also be braced on the side of sealing seat 10.

At the edge of the other extreme orifice 28 of molded rubber part 22 is a ring segment 38, which is in parallel to armature plate 8 and affixed thereto, so that armature plate 8 is flexibly attached to magnetic core 6 via elastic molded rubber part 22. A middle section 40 of the wall of molded rubber part 22 is preferably curved radially outward, so that armature plate 8 is able, in particular, to execute axial movements in the direction of longitudinal valve axis 32 in order to close or release sealing seat 10.

Figure 2:
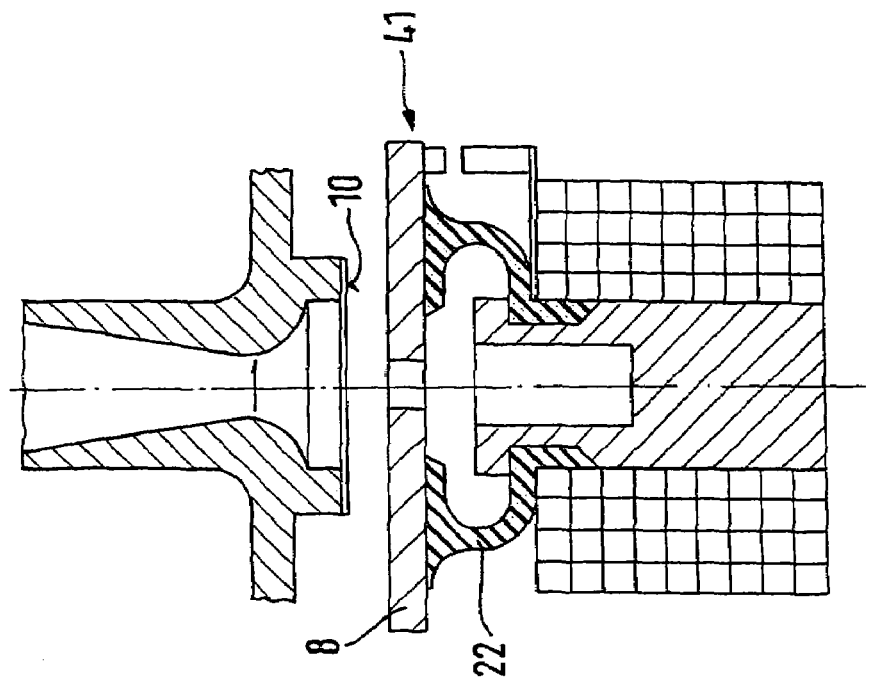
FIG. 2 the longitudinal section from FIG. 1 without helical spring.

In FIG. 2, tank-vent valve 1 is likewise shown in the currentless state, but without helical spring 18. The reason for this is that, disregarding the weight force of armature plate 8, molded rubber part 22 is unstressed without helical spring 18 and without magnetic forces and it is thus possible to represent its force-free neutral position 41. In this unstressed neutral position 41 of molded rubber part 22, armature plate 8 is set apart from sealing seat 10. It is obvious that at least the expanded center section 40 of the wall of molded rubber part 22 is elastically bent or expanded or compressed upon deflection from neutral position 41, and consequently is able to exert axial forces on armature plate 8 to which it is connected. For instance, the wall of molded rubber part 22 is bent or expanded in the direction of the sealing seat when the compressive force of helical spring 18 moves armature plate 8 into the closing position shown in FIG. 1. Molded rubber part 22 thereby exerts tractive forces on armature plate 8, which attempt to reset it, away from sealing seat 10 into neutral position 41. However, it is obvious that the closing forces of helical spring 18, which always act as compressive forces, are greater than the tractive forces generated by molded rubber part 22, since otherwise no sealing closure of sealing seat 10 could be achieved by armature plate 8. The magnitude of the spring forces acting upon the armature plate may easily be adapted to the particular requirements by an appropriate selection of the spring parameters.

If, starting from the currentless closing position according to FIG. 1, excitation coil 4 is energized, this results in magnetic forces, which act counter to the compressive forces of helical spring 18 and lift armature plate 8 off from sealing seat 10. Consequently, a connection is established between the reservoir, which includes an active carbon filter, and the intake manifold of the internal combustion engine. An impact of armature plate 8 on end face 42 of magnetic core 6, which is not desirable for noise reasons, is prevented by rubber knobs 44, which are located on the side of armature plate 8 facing toward magnetic core 6 and strike against a stop 46 secured in position on electromagnet 2. In the energized state of electromagnet 2, armature plate 8 then has a low clearance with respect to end face 42 of magnetic core 6.

Therefore, the length of travel covered by armature plate 8 between making contact at stop 46 and making contact at sealing seat 10 constitutes a valve lift of tank-vent valve 1, which, for illustrative purposes, is represented in a highly enlarged view in FIG. 1 and FIG. 2. Neutral position 41 of molded rubber part 22 is located between the limits of the valve lift, preferably in an approximately centrical position.

The length of travel covered by armature plate 8 immediately after the current is switched off is then divided into three stages.

In a first stage, which extends from stop 46 on electromagnet 2 (opening position of tank-vent valve 1) to neutral position 41 of molded rubber part 22, armature plate 8 is stressed by a compressive force made up of the compressive force of helical spring 18 and a compressive force, acting in the same direction, of the now compressed molded rubber part 22, this compressive force driving it away from stop 46. The second stage is formed by neutral position 41 of the then undeformed molded rubber part 22, in which it generates no force, but helical spring 18 continues to generate a compressive force directed toward sealing seat 10. In the course of a third stage, which lies between neutral position 41 of the molded rubber part and armature plate 8 making contact with sealing seat 10, the compressive force of helical spring 18 continues to act, in addition to a tractive force, however, which acts in an opposite direction thereto and results from the bending and expansion of molded rubber part 22. This tractive force acting counter to the closing force during the third stage of the closing procedure, effects a damping of the impact of armature plate 8 on sealing seat 10, since the closing force of helical spring 18 is reduced to this extent in the end stage of the closing procedure.

Figure 4:
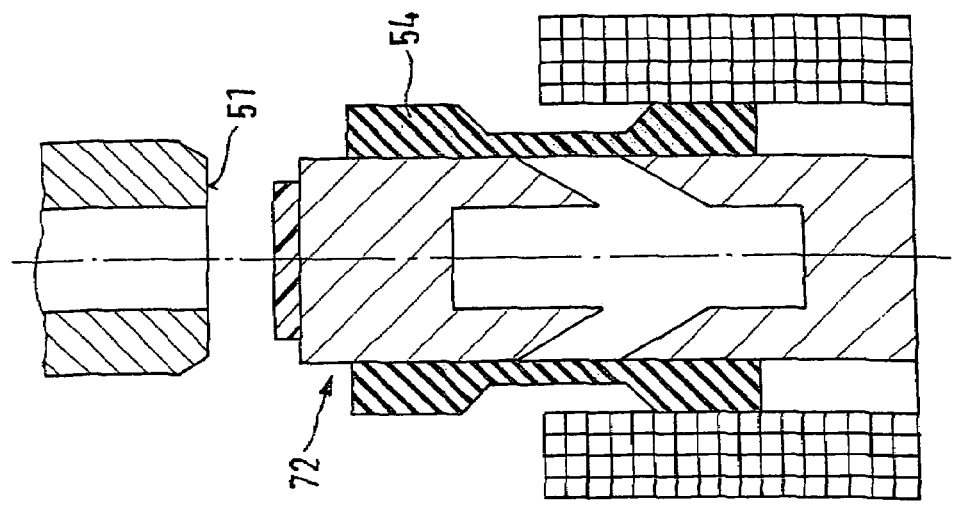
FIG. 4 the longitudinal section from FIG. 3 without helical spring.
Figure 3:
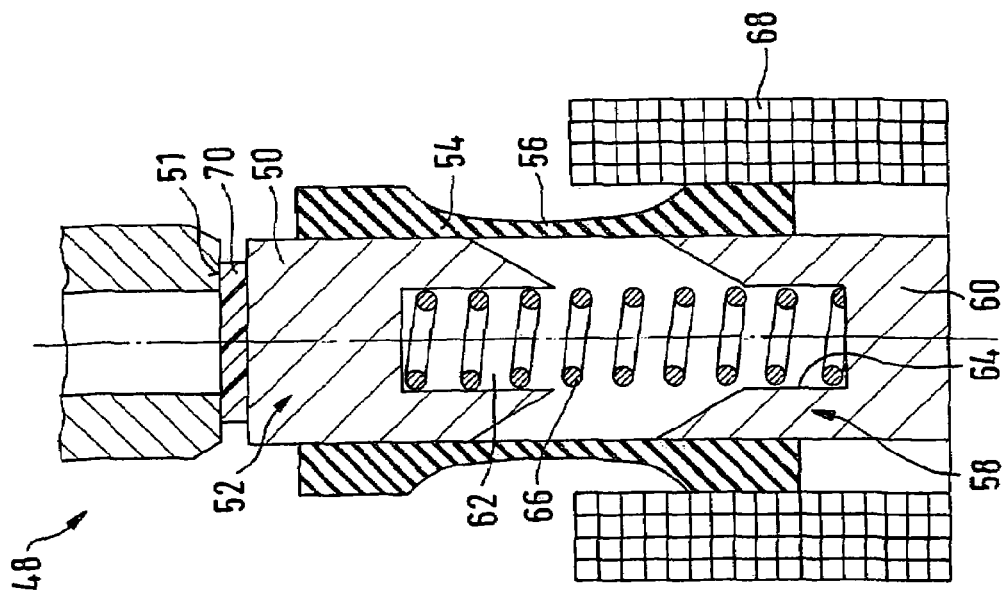
FIG. 3 a longitudinal section of an additional specific embodiment of the solenoid valve according to the present invention, with a valve member stressed by a helical spring.

In a second exemplary embodiment of a tank-vent valve 48 according to the present invention as shown in FIGS. 3 and 4, a cylindrical armature pin 50 is used as valve member in place of an armature plate, the armature pin 50 being secured in position in the end-side orifice 52, facing toward sealing seat 51, of a molded rubber part 54. Molded rubber part 54 is in the form of a cylindrical sleeve, the width being reduced in a center section 56 so as to allow the rubber material to expand or be compressed preferably in this region. The other end of molded rubber part 54, which is also formed as cylindrical orifice 58, is axially pulled a certain distance over magnetic core 60 embodied as cylindrical pin, which is positioned coaxially with armature pin 50 and secured in position on magnetic core 60. Armature pin 50 and magnetic core 60 are provided with coaxial blind-end bores 62, 64 facing each other, in which one end of a helical spring 66 is accommodated in each case. End 58, on the side of magnetic core, of molded rubber part 54 is positioned between magnetic core 60 and an excitation coil 68.

FIG. 3 shows tank-vent valve 48 in its currentless closing position in which a damping and sealing element 70, which is situated on the end face of armature pin 50, abuts against sealing seat 51. The closing force acting upon armature pin 50 is again generated as compressive force by helical spring 66 braced on magnetic core 60, the compressive force pressing armature pin 50 beyond neutral position 72 of molded rubber part 54 indicated in FIG. 4, against sealing seat 51. In this embodiment, too, as can be inferred from FIG. 4, armature pin 50 is set apart from sealing seat 51 in neutral position 72 of molded rubber part 54, so that molded rubber part 54, upon deflection from neutral position 72 in the direction of sealing seat 51, generates tractive forces by material expansion, which are directed counter to the compressive forces of helical spring 66. As a result, as in the previously described specific embodiment, the impact of the valve member, formed by armature pin 50, on sealing seat 51 is damped.

What is claimed is:

1. A solenoid valve, comprising:
   at least one valve orifice to form a sealing seat;
   a valve member cooperating therewith to release and close the sealing seat;
   at least one spring element to stress the valve member;
   an electromagnet to activate the valve member, the electromagnet having a magnetic core; and
   at least one additional spring element in an essentially unstressed neutral position to act upon the valve member in an activation direction, the valve member being set apart from the sealing seat,
   wherein the at least one additional spring element is hollow, one end of the additional spring element being secured to the magnetic core of the electromagnet and the other end of the additional spring element being secured to the valve member, the at least one additional spring element including a section radially expandable toward an outside with regard to a valve axis to provide an axial spring force in the activation direction;
   wherein the essentially unstressed neutral position of the additional spring element is assigned a position of the valve member between limits of a valve lift.

2. The solenoid valve of claim 1, wherein the solenoid valve operates as a tank-vent valve for tank venting in a motor vehicle.

3. The solenoid valve of claim 1, wherein the at least one spring element and the at least one additional spring element are switched in parallel to one another.

4. The solenoid valve of claim 1, wherein the solenoid valve is closed in a currentless manner and opened in an energized manner, and the at least one spring element is configured to push the valve member into a position that closes the sealing seat.

5. The solenoid valve of claim 4, wherein, upon deflection of the at least one additional spring element from the essentially unstressed neutral position, forces of the at least one additional spring element acting upon the valve member are less than, and are directed counter to, closing forces of the at least one spring element.

6. The solenoid valve of claim 5, further comprising:
   an excitation coil enclosing the magnetic core of the electromagnet; and
   an armature to form the valve member,
   wherein the sealing seat is arranged opposite the electromagnet.

7. The solenoid valve of claim 6, further comprising:
   at least one of an elastic sealing element and a noise-damping element arranged at least on the armature.

8. The solenoid valve of claim 7, wherein the at least one additional spring element is supported on a side of the electromagnet.

9. The solenoid valve of claim 8, wherein the at least one additional spring element is formed by a hollow, dynamically balanced molded rubber part, which is flexible and stressed at least in an axial direction, and which radially encloses the at least one spring element.

10. The solenoid valve of claim 9, wherein the armature includes an armature plate, and the molded rubber part includes a section, which is radially expanded toward an outside.

11. The solenoid valve of claim 10, wherein the molded rubber part includes an end-side orifice to arrange to it on the magnetic core, an outer peripheral area to secure it in position, a second orifice, and a ring segment at an edge of the second orifice, which is parallel to the armature plate and affixed thereto.

12. The solenoid valve of claim 9, wherein the molded rubber part includes extreme orifices to secure the armature and the magnetic core in position, the armature and the magnetic core each being cylindrical pins.

13. The solenoid valve of claim 12, wherein the molded rubber part includes a hollow cylinder and includes a region lying between the armature and the magnetic core, having a reduced wall thickness as compared to other regions of the molded rubber part.

* * * * *